United States Patent Office 3,278,418
Patented Oct. 11, 1966

3,278,418
HYDROCARBON CONVERSION CATALYST FOR THE HYDROCRACKING OF HYDROCARBON OILS, COMPRISING RHENIUM AND SILVER ON A SILICA-ALUMINA CRACKING BASE
William B. Wilson, Pleasant Hill, Calif., assignor to Shell Oil Company, New York, N.Y., a corporation of Delaware
No Drawing. Filed Apr. 30, 1962, Ser. No. 191,301
15 Claims. (Cl. 208—111)

This invention relates to hydrocarbon conversion process and improved catalyst therefor. In particular, the invention is related to the hydrocracking of hydrocarbon with a catalyst comprising rhenium.

Hydrocracking is a well known process which has been practiced commercially in Europe before and during World War II. Early catalysts for the hydrocracking process comprised a hydrogenation component on an activated clay such as tungsten disulfide on HF activated Terrana clay, or iron on HF activated montmorillonite. After the war, improved catalysts such as molybdenum or nickel on silica-alumina were developed.

A catalyst has now been found which is active and stable for the conversion of heavy oils to lower boiling materials. The improved catalyst comprises rhenium deposited on a porous support. The amount of rhenium in the catalyst is about 0.01 to 5% w., preferably 0.05 to 2% w., based on the total catalyst. Rhenium is quite expensive; therefore, for economic reasons, it is desirable to hold the rhenium content of the catalyst as low as practical. A particularly advantageous hydrocracking catalyst is a catalyst comprising rhenium and silver on a porous support. While hydrocracking activity of rhenium on, for example, silica alumina is quite good, activity is enhanced by the addition of silver. The amount of silver, which is considerably less expensive than rhenium, may be about 0.1 to 10% by weight based on the total catalyst. A large amount of silver does not affect the cost of the catalyst as does a large amount of rhenium.

The porous support can be any suitable support having a strongly acidic cracking function such as the acid-acting refractory oxides. An excellent support is silica-alumina, the silica content being about 50% to 90% by weight and the alumina content being about 50% to 10% by weight. A particularly preferred silica-alumina comprises about 70% to 90% silica and 30% to 10% alumina. Although halide promoted aluminas, for example HF treated alumina, can be used if desired, these supports are considered to be better for isomerization activity than cracking activity. Although the mechanism by which the hydrocracking conversion is effected is not fully known or understood, it is considered that a good balance is required between the hydrogenation component and the acidic component so as to provide a high ratio of isoparaffin to normal paraffin in the product. The strongly acidic function provided by a siliceous cracking catalyst such as silica-alumina is beneficial in providing a balanced catalyst. If desired, fluoride, boria and the like can be incorporated in the support.

The most practical method of incorporating rhenium into the catalyst is to impregnate the base, as a hydrogel or after calcination, with a solution of a rhenium compound. Suitable rhenium compounds which are readily available are, for example, the perrhenates such as ammonium perrhenate, sodium perrhenate, and the like. The ion-exchange method whereby a metal component is incorporated into a catalyst by ion-exchange with a hydrogel, e.g. silica-alumina hydrogel, requires a compound wherein the metal is present as a cation. Compounds wherein rhenium is present as a cation are not commonly available. Another method, cogelation, is generally unsatisfactory since rhenium does not lend itself to cogelation with silica-alumina.

To incorporate silver into the catalyst, any of the above methods, i.e. impregnation, ion-exchange, or cogelation, can be used. However, cogelation of silver with silica-alumina has the disadvantage that a portion of the silver is lost during washing of the hydrogel. Catalysts prepared by ion-exchanging silver into a silica-alumina hydrogel, preferably a hydrogel which has been treated with concentrated ammonium hydroxide, are highly active and are preferred.

The catalyst is dried and calcined for a period of time at a temperature in the range of about 900° to 1200° F. Activity of the catalyst apparently is enhanced by a treatment with a sulfiding gas such as a mixture of hydrogen and hydrogen sulfide (e.g. 10 $H_2$/1 $H_2S$). If desired, the calcined catalyst can be placed in the reactor and contacted, in the presence of hydrogen, at a relatively low temperature with a hydrocarbon, such as the hydrocracking feed, containing a volatile decomposable sulfur compound.

Hydrocarbon oils which are to be hydrocracked by the catalyst of the present invention are preferably distillates or gas oils boiling in the range from about 350° F. to about 850° F., such as catalytically cracked heavy gas oil, coking gas oil, and the like. Since hydrocarbon oils available as feed to hydrocracking process generally contain considerable amounts of deleterious impurities such as nitrogen compounds, it is preferred to subject such feeds to a pretreatment, such as a hydrotreatment, to reduce such compounds to a low level. The hydrotreatment is generally effected to reduce nitrogen content of the oil to less than 25 parts per million, preferably less than 10 parts per million by weight.

The hydrocracking process is carried out at a temperature of about 500° to about 1000° F., 500 to 3000 p.s.i.g., 0.1 to 10 liquid hourly space velocity (LHSV) and a hydrogen oil molar ratio of 5 to about 50. Preferred operating conditions are 600° to 850° F., 1000 to 2000 p.s.i.g., 0.5 to 4 LHSV and 10 to 40 hydrogen/oil molar ratio.

The catalysts of the invention are illustrated by the following specific examples.

Fixed beds of various catalysts were employed to hydrocrack hydrogenated catalytically cracked gas oil (boiling range approximately 500°–800° F, 2 p.p.m. w. N) at 4 LHSV, 644° F. (340° C.), 1500 p.s.i.g. and 10/1 hydrogen to oil mole ratio. Except as noted, each catalyst was treated with a mixture of hydrogen and hydrogen sulfide gas (10 $H_2$/1 $H_2S$) prior to introduction of oil. Activity and stability were determined for each catalyst preparation. Activity index corresponds to conversion to material below $C_{12}$ at 3 hours time whereas stability is the percent retention of activity after a decade of running, e.g. indicated activity at 10 hours as a percent of activity at one hour. Hydrocracking results are given in Table I for various catalysts.

Table I

| Catalyst No. | 1 | 2 | 3 | 4 | 5 | 6 | 7 | 8 |
|---|---|---|---|---|---|---|---|---|
| Ag conc., weight percent | 5 | | | 1 | 1 | 1 | 4 | 4 |
| Re conc., weight percent | | 2 | 2 | 0.3 | 0.3 | 0.8 | 1 | 1 |
| Activity index | 33 | 42 | 47 | 60 | 65 | 30 | 95 | 60 |
| Stability index | 75 | 80 | 85 | 75 | 50 | 75 | 60 | 60 |
| Test Duration, Vol. oil/vol. cat. | 26 | 18 | 14 | 24 | 24 | 22 | 22 | 132 |

The catalysts shown in Table I were prepared as follows:

Catalyst 1 was prepared by impregnating silver nitrate on pilled synthetic silica-alumina (approximately 13% w. Al$_2$O$_3$) cracking catalyst treated with 1% Dow Corning silicone oil. The impregnated catalyst was calcined 2 hours at 1020° F.

Catalyst 2 was prepared by impregnating ammonium perrhenate on pilled synthetic silica-alumina (approximately 13% w. Al$_2$O$_3$) cracking catalyst treated with 1% Dow Corning silicone oil. The impregnated catalyst was calcined 2 hours at 1020° F.

Catalyst 3 was prepared by impregnating ammonium perrhenate on pilled synthetic silica-alumina (approximately 25% w. Al$_2$O$_3$) cracking catalyst treated with 1% Dow Corning silicone oil. The impregnated catalyst was calcined 2 hours at 1020° F.

Catalyst 4 was prepared by impregnating silver nitrate on pilled synthetic silica-alumina (approximately 13% w. Al$_2$O$_3$) cracking catalyst treated with 1% Dow Corning silicone oil. The impregnated catalyst was dried at 250° F. and then impregnated with ammonium perrhenate, after which it was dried and calcined at 1020° F.

Catalyst 5 was prepared by pilling a synthetic silica-alumina (approximately 25% w. Al$_2$O$_3$) cracking catalyst. The pills were treated with 1% Dow Corning silicone oil and then with a dilute solution of hydrofluoric acid to incorporate approximately 1% w. F. in the catalyst. The treated pills were impregnated with silver nitrate solution, dried, and impregnated with ammonium perrhenate solution. The impregnated catalyst was dried and then calcined at 1020° F.

Catalyst 6 was prepared by mixing solutions of sodium silicate, sodium aluminate, and silver nitrate in proportions to give approximately 75% w. silica and 25% w. alumina in the silica-alumina base. The mixture was brought to a pH of about 7 by the addition of dilute sulfuric acid. The hydrogel which formed was aged for a short period of time, filtered, and then washed with ammonium nitrate solution and water to remove sodium ions. A portion of the silver was leached from the hydrogel during the washing operation; therefore, the concentration listed in the table above is a nominal value. The wet gel was then impregnated with a solution of ammonium perrhenate, dried, and calcined at 1020° F. This catalyst was not pretreated with a mixture of hydrogen and hydrogen sulfide.

Catalyst 7 was prepared by mixing solutions of sodium silicate, sodium aluminate, and sodium fluoride in proportions to give approximately 28% w. alumina and 1.5% w. fluorine in the gel. The mixture was brought to a pH of about 7 by the addition of dilute sulfuric acid. The hydrogel which formed was aged for a short period of time, filtered, and washed with ammonium nitrate solution and water to remove sodium ions. The washed gel was slurried in silver nitrate solution to incorporate silver ions into the hydrogel by ion-exchange with ammonium ions. The gel was washed with water and impregnated with a solution of ammonium perrhenate, after which the gel was dried and calcined in air at 1020° F. The metal concentrations are only nominal.

Catalyst 8 was prepared in the manner described for catalyst 7 except that calcination was effected in a hydrogen atmosphere.

These data indicate that the rhenium catalysts have good activity and stability for hydrocracking and, moreover, that activity is improved by incorporating silver with the rhenium. The relatively poor activity indicated for catalyst 6 is attributed to the lack of a presulfiding treatment.

The importance of treating the hydrocarbon feed to remove nitrogen compounds is shown by a further experiment. In the case of a catalytically cracked gas oil hydrogenated to a total nitrogen content of 46 p.p.m. w., an activity index and stability index of only 10 and 5, respectively, are obtained when the oil is hydrocracked over catalyst 6, presulfided prior to use.

I claim as my invention:

1. A catalyst suitable for hydrocracking hydrocarbon oils which comprises from about 0.01 to 5% by weight rhenium and about 0.1 to 10% by weight silver intimately associated with an acid-acting refractory oxide support.

2. A catalyst suitable for hydrocracking hydrocarbon oils which comprises from about 0.1 to 5% by weight rhenium and from about 0.1 to 10% by weight silver intimately associated with a support comprising silica-alumina.

3. The catalyst of claim 2 wherein said rhenium and said silver is deposited on the silica-alumina by impregnation.

4. The catalyst according to claim 2 wherein at least the silver is intimately associated with the silica-alumina by ion-exchange of a silver salt with silica-alumina hydrogel from which sodium has been removed.

5. A catalyst suitable for hydrocracking hydrocarbon oils which comprises from about 0.01 to 5% by weight rhenium and from about 0.1 to 10% by weight silver intimately associated with a support comprising silica-alumina, said catalyst being sulfided after calcination.

6. A method of hydrocracking a heavy hydrocarbon oil which comprises contacting said oil in the presence of hydrogen under hydrocracking conditions with a catalyst comprising from about 0.05% to 2% by weight rhenium and about 0.1% to 10% by weight silver intimately associated with a porous acid-acting refractory oxide.

7. A method of hydrocracking a heavy hydrocarbon oil which comprises contacting said oil in the presence of hydrogen under hydrocracking conditions with a catalyst comprising from about 0.05% to 2% by weight rhenium and about 0.1% to 10% by weight silver intimately associated with silica-alumina.

8. A method of hydrocracking a heavy hydrocarbon oil which comprises contacting said oil in the presence of hydrogen under hydrocracking conditions with a catalyst comprising from about 0.05% to 2% by weight rhenium and about 0.1% to 10% by weight silver intimately associated with silica-alumina.

9. A method of hydrocracking a heavy hydrocarbon oil which comprises contacting said oil with a catalyst comprising from about 0.1 to 5% by weight rhenium and 0.1 to 10% silver intimately combined with a porous acid-acting refractory oxide support at a temperature in the range from 500° to 1000° F., a pressure in the range from 500 to 3000 p.s.i.g., a liquid hourly space velocity from about 0.1 to 10, and a hydrogen to oil mole ratio in the range from about 5 to 50.

10. A method of hydrocracking a heavy hydrocarbon oil which comprises contacting said oil with a catalyst comprising from about 0.05 to 2% by weight rhenium and about 0.1 to 10% by weight silver intimately combined with silica-alumina cracking catalyst at a temperature in the range from about 500° to 1000° F., a pressure in the range from about 500 to 3000 p.s.i.g., a liquid hourly space velocity from about 0.1 to 10, and a hydrogen to oil mole ratio in the range from about 5 to 50.

11. A method of hydrocracking a heavy hydrocarbon oil which comprises contacting a gas oil boiling in the range from about 350° to 850° F. with a catalyst comprising from about 0.05 to 2% by weight rhenium and about 0.1 to 10% by weight silver intimately combined with silica-alumina cracking catalyst at a temperature in the range from about 600° to 850° F., a pressure in the range from about 1000 to 2000 p.s.i.g., a liquid hourly space velocity of 0.5 to 4, and a hydrogen to oil mole ratio or from about 10 to 40.

12. The method according to claim 11 wherein the gas oil has a nitrogen content of less than 25 parts per million by weight.

13. A method of hydrocracking a heavy hydrocarbon oil which comprises contacting said oil with a sulfided catalyst comprising from about 0.01 to 5% by weight rhenium and 0.1 to 10% silver intimately combined with a porous acid-acting refractory oxide support at a temperature in the range from 500° to 1000° F., a pressure in the range from 500 to 3000 p.s.i.g., a liquid hourly space velocity from about 0.1 to 10, and a hydrogen to oil mole ratio in the range from about 5 to 50.

14. A method of hydrocracking a heavy hydrocarbon oil which comprises contacting said oil with a sulfided catalyst comprising from about 0.01 to 5% by weight rhenium and 0.1 to 10% silver intimately combined with silica-alumina cracking catalyst at a temperature in the range from about 500° to 1000° F., a pressure in the range from about 500 to 3000 p.s.i.g., a liquid hourly space velocity from about 0.1 to 10, and a hydrogen to oil mole ratio in the range from about 5 to 50.

15. The method according to claim 14 wherein the oil boils within the range from about 350° to 850° F.

References Cited by the Examiner

UNITED STATES PATENTS

| | | | |
|---|---|---|---|
| 1,876,009 | 9/1932 | Krauch et al. | 208—112 |
| 2,118,940 | 5/1938 | Pier et al. | 208—108 |
| 2,744,057 | 5/1956 | Emmitt | 208—120 |
| 2,926,130 | 2/1960 | Hogan | 208—110 |
| 2,944,005 | 7/1960 | Scott | 208—110 |
| 2,971,903 | 2/1961 | Kimberlin et al. | 208—119 |
| 3,072,560 | 1/1963 | Paterson | 208—110 |
| 3,073,777 | 1/1963 | Oettinger | 208—112 |

DELBERT E. GANTZ, *Primary Examiner.*
M. STERMAN, A. D. SULLIVAN, *Examiners.*
A. RIMENS, *Assistant Examiner.*